United States Patent
Kang

(10) Patent No.: US 7,929,509 B2
(45) Date of Patent: Apr. 19, 2011

(54) REDUCED CELL ACQUISITION TIME

(75) Inventor: Inyup Kang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1442 days.

(21) Appl. No.: 11/126,526

(22) Filed: May 10, 2005

(65) Prior Publication Data

US 2006/0268808 A1    Nov. 30, 2006

(51) Int. Cl.
     *H04B 7/216* (2006.01)
(52) U.S. Cl. ........ 370/342; 370/335; 370/441; 375/145; 375/148; 375/150
(58) Field of Classification Search .......... 370/342, 370/335, 441; 375/145, 148, 150
     See application file for complete search history.

(56) References Cited

U.S. PATENT DOCUMENTS

| | | | |
|---|---|---|---|
| 6,768,768 B2 | 7/2004 | Rao et al. | |
| 2003/0095516 A1* | 5/2003 | Ok et al. | 370/331 |
| 2003/0181183 A1 | 9/2003 | Ventura | |
| 2003/0202541 A1* | 10/2003 | Lim et al. | 370/503 |
| 2004/0062300 A1* | 4/2004 | McDonough et al. | 375/150 |
| 2004/0174849 A1* | 9/2004 | Yuan et al. | 370/335 |
| 2004/0247019 A1* | 12/2004 | McDonough et al. | 375/148 |
| 2005/0047492 A1 | 3/2005 | Amerga et al. | |
| 2005/0075125 A1 | 4/2005 | Bada et al. | |

OTHER PUBLICATIONS

"Fast acquisition method for DS-CDMA systems employing asynchronous base stations"; Sriram, S.; Hosur, S.; pp. 1928-1932 vol. 3;Digital Object Identifier 10.1109/ICC.1999.765597.*
International Search Report issued in International Application No. PCT/US2006/17879 filed May 8, 2006.

* cited by examiner

*Primary Examiner* — Kent Chang
*Assistant Examiner* — Dung Lam
(74) *Attorney, Agent, or Firm* — Sayed H. Beladi

(57) ABSTRACT

A method and apparatus for reduced acquisition time are disclosed. In one embodiment, such as in a W-CDMA system, a receiver receives one or more signals from remote stations, each signal comprising a scrambling code associated with one of a plurality of code groups, each code group identified by a unique series of a synchronization codes. A searcher identifies a subset of first synchronization codes, and a processor selects one or more hypotheses in response to the received subset. The searcher may then perform searching for a scrambling code in accordance with the one or more hypotheses. The scrambling code search may be performed in parallel with continued synchronization code searching. Various other embodiments are also disclosed.

32 Claims, 11 Drawing Sheets

REDUCED CELL ACQUISITION TIME

BACKGROUND

1. Field

The present invention relates generally to communications, and more specifically to reduced cell acquisition time.

2. Background

Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (4) some other standards.

Pseudorandom noise (PN) sequences are commonly used in CDMA systems for spreading transmitted data, including transmitted pilot signals. The time required to transmit a single value of the PN sequence is known as a chip, and the rate at which the chips vary is known as the chip rate. CDMA receivers commonly employ RAKE receivers. A rake receiver is typically made up of one or more searchers for locating direct and multipath pilots from one or more base stations, and two or more multipath demodulators (fingers) for receiving and combining information signals from those base stations.

Inherent in the design of direct sequence CDMA systems is the requirement that a receiver must align its PN sequences to those of a base station. Some systems, such as those defined by the W-CDMA standard, differentiate base stations using a unique PN code for each, known as a primary scrambling code. The W-CDMA standard defines two Gold code sequences for scrambling the downlink, one for the in-phase component (I) and another for the quadrature (Q). The I and Q PN sequences together are broadcast throughout the cell without data modulation. This broadcast is referred to as the common pilot channel (CPICH). The PN sequences generated are truncated to a length of 38,400 chips. The period of 38,400 chips is referred to as a radio frame. Each radio frame is divided into 15 equal sections referred to as slots. W-CDMA base stations operate asynchronously in relation to each other, so knowledge of the frame timing of one base station does not translate into knowledge of the frame timing of any other base station.

It is possible to search for W-CDMA base stations offset by offset (38,400 of them) for each of the 512 primary codes. However, this is not practical due to the excessive amount of time such a search would require. Instead, the W-CDMA standard calls for base stations to transmit two additional synchronization channels, the Primary Synchronization Channel (PSC) and the Secondary Synchronization Channel (SSC), to assist the subscriber unit in searching efficiently. As a result, W-CDMA search can be performed in three steps, which will be detailed more fully below.

For initial acquisition, the three-step W-CDMA search provides a great performance increase, in terms of reduced search time, over the impractical alternative of searching the entire PN space for each scrambling code. Search time is an important metric in determining the quality of a CDMA system. Decreased search time implies that searches can be done more frequently. As such, a subscriber unit can locate and access the best available cell more often, resulting in better signal transmission and reception, often at reduced transmission power levels by both the base station and the subscriber unit. This, in turn, increases the capacity of the CDMA system (either in terms of support for an increased number of users, or higher transmission rates, or both). Furthermore, decreased search time is also advantageous when a subscriber unit is in idle mode, a low-power state where a subscriber unit is not actively transmitting or receiving voice or data, but is periodically monitoring the system. Reduced search time allows the subscriber unit to spend more time in the low power state, thus reducing power consumption and increasing standby time.

These benefits may be increased with additional reductions in acquisition time beyond the three-step searching method. There is therefore a need in the art for reducing cell acquisition time.

SUMMARY

According to one aspect, an apparatus is described which includes a receiver for receiving one or more signals from one or more remote stations, each signal comprising one of a plurality of scrambling codes, each scrambling code associated with one of a plurality of code groups, each code group comprising a subset of the plurality of scrambling codes, and each code group identified by a unique series of a predetermined number of first synchronization codes selected from a plurality of first synchronization codes, a first searcher for identifying a subset of first synchronization codes, the subset comprising fewer than the predetermined number, and a processor for selecting one or more hypotheses in response to the received subset.

According to another aspect, a method is disclosed for receiving one or more signals from one or more remote stations, each signal comprising one of a plurality of scrambling codes, each scrambling code associated with one of a plurality of code groups, each code group comprising a subset of the plurality of scrambling codes, and each code group identified by a unique series of a predetermined number of first synchronization codes selected from a plurality of first synchronization codes, identifying a subset of first synchronization codes, the subset comprising fewer than the predetermined number, and determining one or more hypotheses in response to the received subset.

According to another aspect, an apparatus is disclosed which includes a receiver for receiving one or more signals from one or more remote stations, each signal comprising one of a plurality of scrambling codes, each scrambling code associated with one of a plurality of code groups, each code group comprising a subset of the plurality of scrambling codes, and each code group identified by a unique series of a predetermined number of first synchronization codes selected from a plurality of first synchronization codes, and means for determining one or more hypotheses in response to a received subset of first synchronization codes identifying a subset of first synchronization codes, the subset comprising fewer than the predetermined number.

According to another aspect, computer readable media is disclosed, operable to perform receiving one or more signals from one or more remote stations, each signal comprising one of a plurality of scrambling codes, each scrambling code associated with one of a plurality of code groups, each code group comprising a subset of the plurality of scrambling codes, and each code group identified by a unique series of a predetermined number of first synchronization codes selected from a plurality of first synchronization codes, identifying a subset of first synchronization codes, the subset comprising fewer than the predetermined number, and determining one or more hypotheses in response to the received subset.

According to another aspect, a wireless communication system is disclosed including a first station for transmitting a signal comprising one of a plurality of scrambling codes, each scrambling code associated with one of a plurality of code groups, each code group comprising a subset of the plurality of scrambling codes, and each code group identified by a unique series of a predetermined number of first synchronization codes selected from a plurality of first synchronization codes, and a second station for receiving the signal, identifying a subset of first synchronization codes, the subset comprising fewer than the predetermined number, and selecting one or more hypotheses in response to the received subset.

Various other aspects and embodiments are also disclosed.

DETAILED DESCRIPTION

One or more exemplary embodiments described herein are set forth in the context of a digital wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps. Method steps can be interchanged without departing from the scope of the present invention.

More specifically, various embodiments of the invention may be incorporated in a wireless communication system operating in accordance with a communication standard outlined and disclosed in various standards published by the Telecommunication Industry Association (TIA) and other standards organizations. Such standards include the TIA/EIA-95 standard, TIA/EIA-IS-2000 standard, IMT-2000 standard, UMTS and W-CDMA standard, GSM standard, all incorporated by reference herein. A copy of the standards may be obtained by writing to TIA, Standards and Technology Department, 2500 Wilson Boulevard, Arlington, Va. 22201, United States of America. The standard generally identified as the UMTS standard, may be obtained by contacting 3GPP Support Office, 650 Route des Lucioles-Sophia Antipolis, Valbonne-France.

Figure 1:
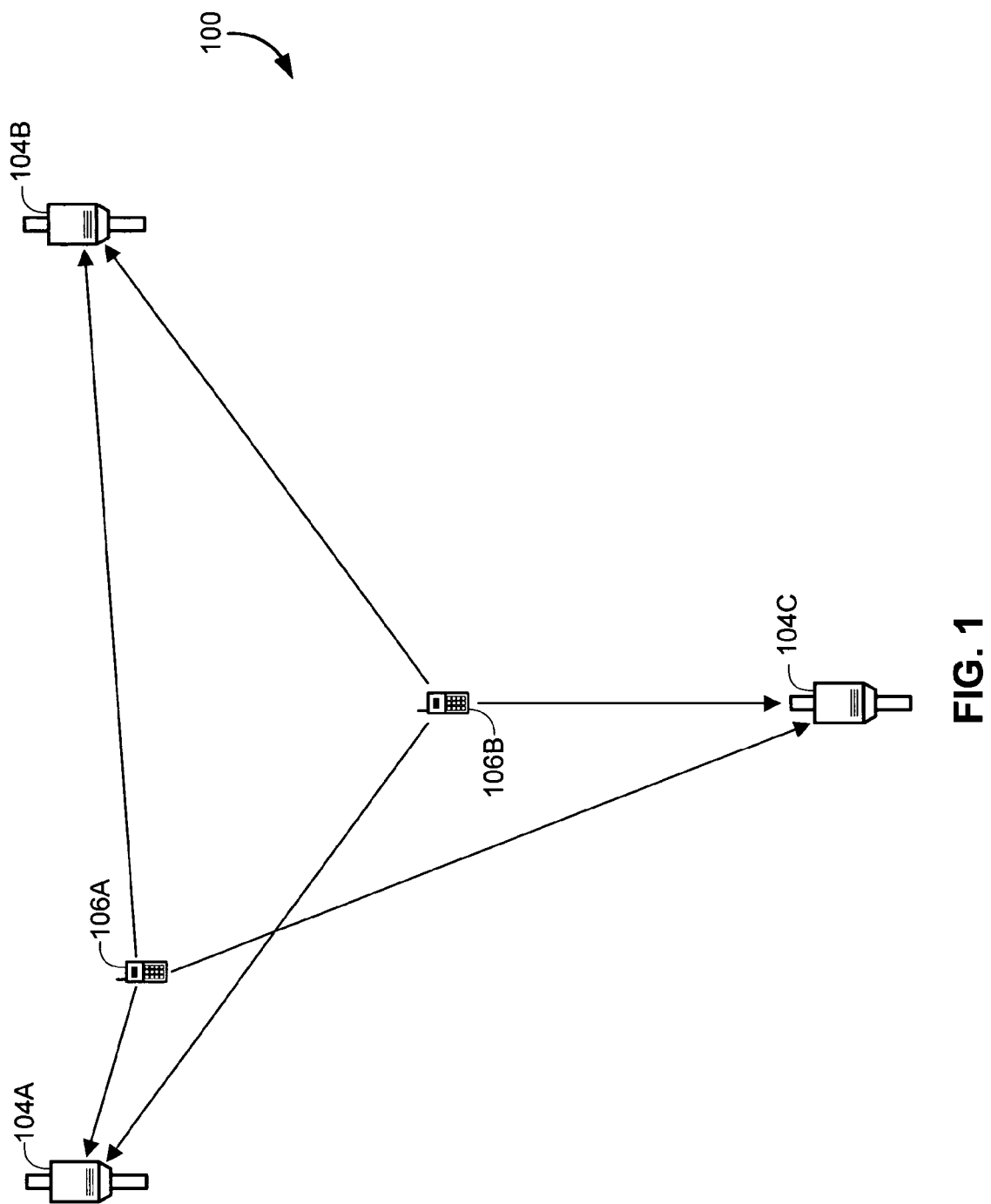
FIG. 1 depicts an example embodiment of a wireless communication system.

FIG. 1 is a diagram of a wireless communication system 100 that may be designed to support one or more CDMA standards and/or designs (e.g., the W-CDMA standard, the IS-95 standard, the cdma2000 standard, the 1xEV-DO specification, the 1xEV-DV system). In an alternative embodiment, system 100 may additionally support any wireless standard or design other than a CDMA system. In the exemplary embodiment, system 100 is a W-CDMA system.

For simplicity, system 100 is shown to include three base stations 104 in communication with two user terminals 106. The base station and its coverage area are often collectively referred to as a "cell". In IS-95, cdma2000, or 1xEV-DV systems, for example, a cell may include one or more sectors. In the W-CDMA specification, each sector of a base station and the sector's coverage area is referred to as a cell. As used herein, the term base station can be used interchangeably with the terms access point or Node B. The term user terminal can be used interchangeably with the terms user equipment (UE), mobile station, subscriber unit, subscriber station, access terminal, remote terminal, or other corresponding terms known in the art. The term mobile station encompasses fixed wireless applications. A base station or user terminal may communicate with other wireless communication devices, such as base stations, user terminals, or other devices, referred to generally as remote stations.

Depending on the CDMA system being implemented, each user terminal 106 may communicate with one (or possibly more) base stations 104 on the forward link at any given moment, and may communicate with one or more base stations on the reverse link depending on whether or not the user terminal is in soft handoff. The forward link (i.e., downlink) refers to transmission from the base station to the user terminal, and the reverse link (i.e., uplink) refers to transmission from the user terminal to the base station.

Various embodiments described herein are directed to providing reverse-link or forward-link signals for supporting forward link transmission, and may be well suited to the nature of forward link transmission. Those skilled in the art will understand that user terminals as well as base stations may be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

A user terminal, while communicating within wireless communication system 100, will generally perform searching from time to time. For example, initial acquisition may be performed to locate any available base station, such as during power up, or when coming out of sleep mode. Searching may also be performed from time to time to determine when and if to perform handoff to another cell.

Figure 2:
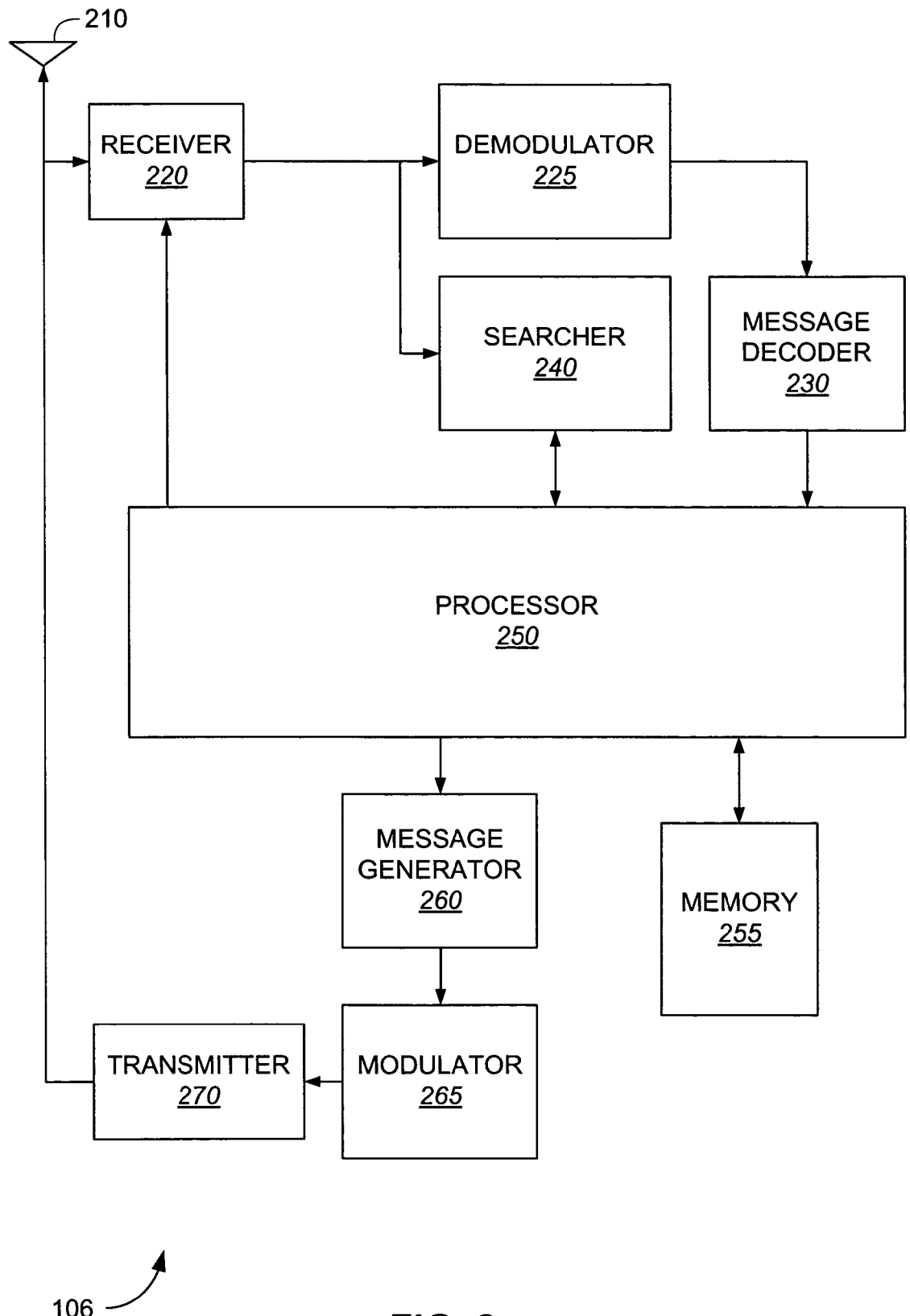
FIG. 2 depicts an example embodiment of a user terminal.

FIG. 2 is a block diagram of a wireless communication device, such as user terminal 106. The blocks depicted in this example embodiment will generally be a subset of the components included in a user terminal 106. Those of skill in the art will readily adapt the embodiment shown in FIG. 2 for use in any number of user terminal configurations. A wireless communication device may comprise one or more Integrated Circuits (ICs). For example, a receiver may comprise one or more special purpose ICs along with a baseband processing IC. Those of skill in the art will recognize that the various blocks illustrated below may be configured in any combination of hardware (including special purpose ICs and/or general purpose processors) and/or software.

Signals are received at antenna 210 and delivered to receiver 220. Receiver 220 performs processing according to one or more wireless system standards, such as the standards listed above. Receiver 220 performs various processing such as Radio Frequency (RF) to baseband conversion, amplification, analog to digital conversion, filtering, and the like. Various techniques for receiving are known in the art. Receiver 220 may receive at various frequencies, as programmed by processor 250. Receiver 220 may include a frequency generator for generating these various frequencies, which may be incorporated with one or more components of the wireless communication device in a Radio Frequency IC (RFIC) (details not shown).

Signals from receiver 220 are demodulated in demodulator 225 according to one or more communication standards. In an example embodiment, a demodulator capable of demodulating GSM and W-CDMA signals is deployed. In alternate embodiments, alternate standards may be supported, and embodiments may or may not support multiple communication formats. Demodulator 230 may perform RAKE receiving, equalization, combining, deinterleaving, decoding, and various other functions as required by the format of the received signals. Various demodulation techniques are known in the art. Data and control channels are examples of channels that can be received and demodulated in receiver 220 and demodulator 225.

Message decoder 230 receives demodulated data and extracts signals or messages directed to the user terminal 106 on the forward or link. Message decoder 230 decodes various messages used in setting up, maintaining and tearing down a call (including voice or data sessions) on a system. Various other message types are known in the art and may be specified in the various communication standards being supported. The messages are delivered to processor 250 for use in subsequent processing. Some or all of the functions of message decoder 230 may be carried out in processor 250, although a discrete block is shown for clarity of discussion. Alternatively, demodulator 225 may decode certain information and send it directly to processor 250 (a single bit message such as an ACK/NAK or a power control up/down command are examples).

Searcher 240 is also deployed to receive signals from receiver 220. Searcher 240 may perform searching on incoming received samples as well as off-line searching on data from a sample RAM (details not shown). Searcher 240 performs searching in accordance with search parameters provided by processor 250. Various techniques for initiating searches of various types with searcher 240 are detailed below. Searcher 240 may be directed to locate and identify one or more scrambling codes from one or more base stations, as described herein. Demodulator 225 may be used in conjunction with the identified scrambling codes to receive and demodulate signals from one or more base stations (which may be combined).

Searchers are well known in the art. Searchers may be comprised of dedicated hardware, processor functions, or a combination of both. In an example searcher, one or more correlators (or matched filters) may be deployed to incorporate incoming I and Q samples with a desired signal, such as a scrambling code, a PSC, or an SSC. Many types of hardware and/or coprocessors have been designed that may allow for concurrent correlation with multiple signals over multiple hypotheses, time offsets, etc. The input to such a correlator may be directly from a receiver 220 or "offline" searching may be performed by storing I and Q samples in a memory and delivering samples from a memory to the correlator. A combination of multiple parallel correlators and/or offline searching at a higher clock rate than the incoming symbol rate may be deployed to allow for testing of multiple hypotheses within a slot time. A typical searcher may deploy a coherent accumulator for accumulating the results for correlation with I and Q values and the associated complex signals. The coherent accumulator may be programmable to accumulate a varying range of samples to produce an estimate. Non-coherent accumulators may also be deployed to accumulate the sum of the squared I and Q coherent accumulations to allow for estimates over a time period longer than the coherence bandwidth. Coherent and non-coherent values may then be sorted, such as in a peak detector, or using any other technique to determine one or more likely candidates (i.e. a match between the signal and the incoming I and Q data stream at the indicated offset period). Software searchers may carry out these steps in processors and/or other types of filtering and detecting techniques may be deployed, all of which fall within the scope of the present invention. Details of the searcher 240 are not shown in FIG. 2.

Signals are transmitted via antenna 210. Transmitted signals are formatted in transmitter 270 according to one or more wireless system standards, examples of which are listed above. Examples of components that may be included in transmitter 270 are amplifiers, filters, digital-to-analog (D/A) converters, radio frequency (RF) converters, and the like. Data for transmission is provided to transmitter 270 by modulator 265. Data and control channels can be formatted for transmission in accordance with a variety of formats. Examples of components that may be incorporated in modulator 265 include encoders, interleavers, spreaders, and modulators of various types.

Message generator 260 may be used to prepare messages of various types, as described herein. For example, a message indicating a located neighbor base station may be generated. Various types of control messages may be generated in a user terminal 106 for transmission on the reverse link.

Data received and demodulated in demodulator 225 may be delivered to processor 250 for use in voice or data communications, as well as to various other components. Similarly, data for transmission may be directed to modulator 265 and transmitter 270 from processor 250. For example, various data applications may be present on processor 250, or on another processor included in the wireless communication device 106 (not shown). Wireless communication device 106 may include a link to or be incorporated with an external device, such as a laptop computer (not shown).

Processor 250 may be a general-purpose microprocessor, a digital signal processor (DSP), or a special-purpose processor. Processor 250 may perform some or all of the functions of receiver 220, demodulator 225, message decoder 230, searcher 240, message generator 260, modulator 265, or transmitter 270, as well as any other processing required by the wireless communication device. Processor 250 may be connected with special-purpose hardware to assist in these tasks (details not shown). Data or voice applications may be external, such as an externally connected laptop computer or connection to a network, may run on an additional processor within wireless communication device 106 (not shown), or may run on processor 250 itself. Processor 250 is connected with memory 255, which may be used for storing data as well as instructions for performing the various procedures and methods described herein. Those of skill in the art will recognize that memory 255 may be comprised of one or more memory components, of various types, that may be embedded in whole or in part within processor 250.

Figure 3:
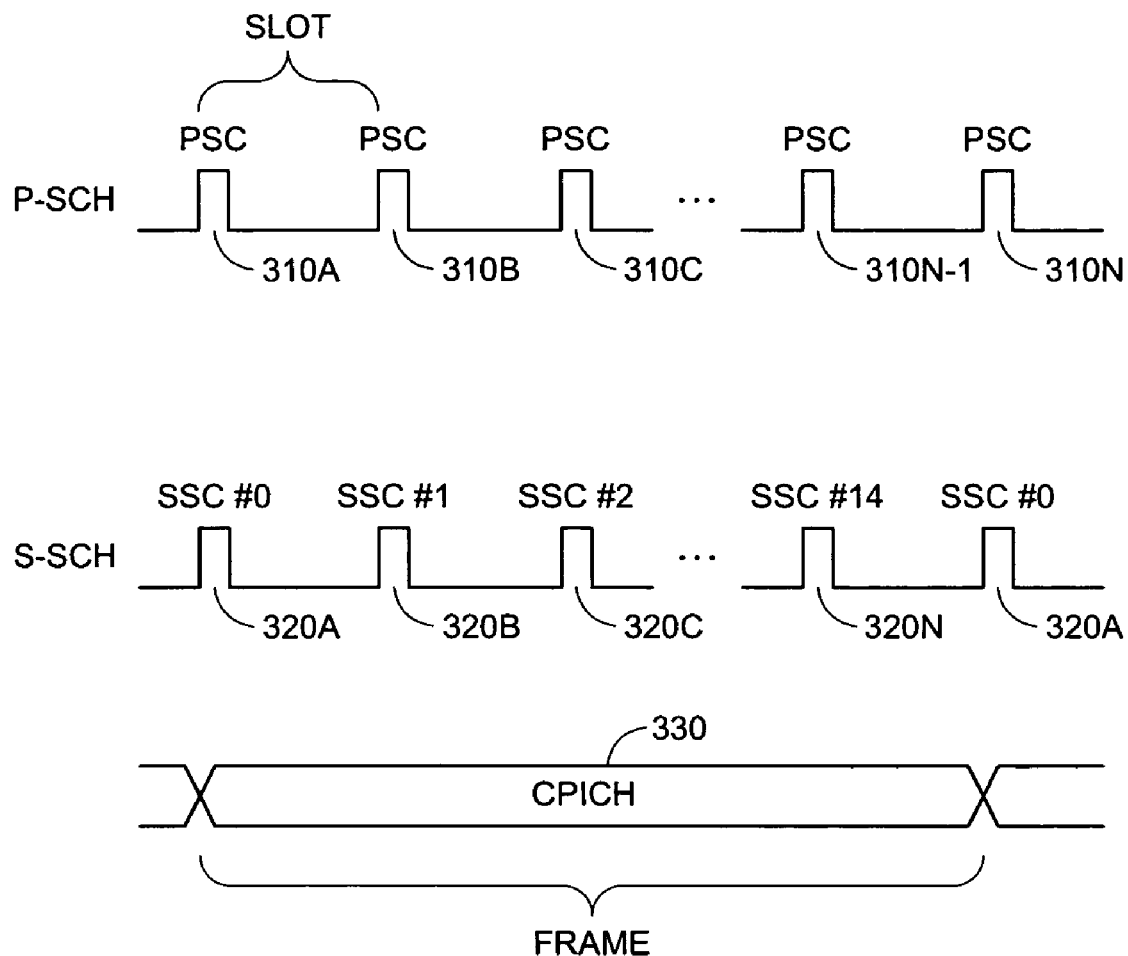
FIG. 3 depicts an example set of signals transmitted in accordance with the W-CDMA standard.

FIG. 3 depicts an example set of signals transmitted in accordance with the WCDMA standard, referenced above. Each base station in a W-CDMA system transmits a number of signals used for synchronization, modulation, and demodulation. Each base station is identified by its Common Pilot Channel (CPICH). In W-CDMA searching, one goal is to locate and identify one or more CPICH signals from one or more base stations. In the example W-CDMA embodiment, the number of allocated scrambling codes are divided into 64 scrambling code groups with each scrambling code group consisting of 8 primary scrambling codes. Each cell is allocated one primary scrambling code. Additional details of the W-CDMA channelization codes may be found in the above referenced standard. The principles disclosed herein apply to W-CDMA signals as well as alternate signals, as will be apparent to one of skill in the art, in light of the teaching herein.

To aid in location and identification of primary scrambling codes, a W-CDMA base station transmits a Primary Synchronization Code (PSC) 310 once during each slot. In this example, the CPICH is transmitted across 15 slots. The PSC is transmitted for a fraction of the slot. Note that the PSC is transmitted identically in all cells. By locating the PSC slot boundaries, timing may be located. Also defined are 15 Secondary Synchronization Codes (SSCs). One SSC is transmitted during each slot. The Synchronization Channel (SCH) is comprised of the Primary Synchronization Channel (P-SCH) and the Secondary Synchronization Channel (S-SCH), which is transmitted concurrently with the common pilot channel. The P-SCH is comprised of a series of PSCs, which may be used to indicate slot timing, as detailed above. The S-SCH is comprised of a series of SSCs. Each code group is identified by a unique series of SSCs 320.

As shown in FIG. 3, during the CPICH period 330, 15 SSCs 320A-N are transmitted. Each SSC is identified by its slot number (0 through 14). The next period of the CPICH starts with a second transmission of SSC #0. The 64 secondary SCH sequences are constructed such that their cyclic shifts are unique, thus, using slot timing determined by identifying and locating a PSC, a series of SSCs may then be determined at each slot boundary. When the series of SSCs is identified, the code group is then identified, as well as the CPICH frame boundary. In this example, each code group contains 8 scrambling codes so that, once the frame timing and code group have been identified, a correlation with the 8 possible scrambling codes may be performed to identify the scrambling code.

As described above, a three-step W-CDMA procedure is well known in the art. Step one search identifies the PSC and thus the slot boundary. Step two searching identifies the sequence of SSCs, to identify the code group sequence as well as the frame boundary. Step three searching is performed to correlate up to 8 scrambling codes to identify the CPICH transmitted within a cell. Detailed herein are techniques for reducing the amount of time required for cell acquisition in various embodiments. An example of step 2 W-CDMA searching is illustrated. Those of skill in the art will recognize that these techniques may be applied to alternate codes and alternate search steps as well.

Table 1 illustrates the SSC sequences for scrambling code groups used in the W-CDMA standard. As shown, there are 15 slots for each scrambling code group. The number indicated during each slot for a code group identifies the SSC transmitted during that slot. The sequence of SSCs thus identifies the scrambling group. For example, group 0 is identified by transmitting across 15 slots the series of SSCs 1, 1, 2, 8, 9, 10, 15, 8, 10, 16, 2, 7, 15, 7, and 16. Upon examination, it can be seen that this sequence is unique to group 0. All other sequences for the respective groups are also unique.

TABLE 1

SSC Sequences For Scrambling Code Groups

| Scrambling Code Group | Slot Number | | | | | | | | | | | | | | |
|---|---|---|---|---|---|---|---|---|---|---|---|---|---|---|---|
| | #0 | #1 | #2 | #3 | #4 | #5 | #6 | #7 | #8 | #9 | #10 | #11 | #12 | #13 | #14 |
| Group 0 | 1 | 1 | 2 | 8 | 9 | 10 | 15 | 8 | 10 | 16 | 2 | 7 | 15 | 7 | 16 |
| Group 1 | 1 | 1 | 5 | 16 | 7 | 3 | 14 | 16 | 3 | 10 | 5 | 12 | 14 | 12 | 10 |
| Group 2 | 1 | 2 | 1 | 15 | 5 | 5 | 12 | 16 | 6 | 11 | 2 | 16 | 11 | 15 | 12 |
| Group 3 | 1 | 2 | 3 | 1 | 8 | 6 | 5 | 2 | 5 | 8 | 4 | 4 | 6 | 3 | 7 |
| Group 4 | 1 | 2 | 16 | 6 | 6 | 11 | 15 | 5 | 12 | 1 | 15 | 12 | 16 | 11 | 2 |
| Group 5 | 1 | 3 | 4 | 7 | 4 | 1 | 5 | 5 | 3 | 6 | 2 | 8 | 7 | 6 | 8 |
| Group 6 | 1 | 4 | 11 | 3 | 4 | 10 | 9 | 2 | 11 | 2 | 10 | 12 | 12 | 9 | 3 |
| Group 7 | 1 | 5 | 6 | 6 | 14 | 9 | 10 | 2 | 13 | 9 | 2 | 5 | 14 | 1 | 13 |
| Group 8 | 1 | 6 | 10 | 10 | 4 | 11 | 7 | 13 | 16 | 11 | 13 | 6 | 4 | 1 | 16 |
| Group 9 | 1 | 6 | 13 | 2 | 14 | 2 | 6 | 5 | 5 | 13 | 10 | 9 | 1 | 14 | 10 |
| Group 10 | 1 | 7 | 8 | 5 | 7 | 2 | 4 | 3 | 8 | 3 | 2 | 6 | 6 | 4 | 5 |
| Group 11 | 1 | 7 | 10 | 9 | 16 | 7 | 9 | 15 | 1 | 8 | 16 | 8 | 15 | 2 | 2 |
| Group 12 | 1 | 8 | 12 | 9 | 9 | 4 | 13 | 16 | 5 | 1 | 13 | 5 | 12 | 4 | 8 |
| Group 13 | 1 | 8 | 14 | 10 | 14 | 1 | 15 | 15 | 8 | 5 | 11 | 4 | 10 | 5 | 4 |
| Group 14 | 1 | 9 | 2 | 15 | 15 | 16 | 10 | 7 | 8 | 1 | 10 | 8 | 2 | 16 | 9 |
| Group 15 | 1 | 9 | 15 | 6 | 16 | 2 | 13 | 14 | 10 | 11 | 7 | 4 | 5 | 12 | 3 |
| Group 16 | 1 | 10 | 9 | 11 | 15 | 7 | 6 | 4 | 16 | 5 | 2 | 12 | 13 | 3 | 14 |

TABLE 1-continued

SSC Sequences For Scrambling Code Groups

| Scrambling Code Group | Slot Number |||||||||||||||
|---|---|---|---|---|---|---|---|---|---|---|---|---|---|---|---|
| | #0 | #1 | #2 | #3 | #4 | #5 | #6 | #7 | #8 | #9 | #10 | #11 | #12 | #13 | #14 |
| Group 17 | 1 | 11 | 14 | 4 | 13 | 2 | 9 | 10 | 12 | 16 | 8 | 5 | 3 | 15 | 6 |
| Group 18 | 1 | 12 | 12 | 13 | 14 | 7 | 2 | 8 | 14 | 2 | 1 | 13 | 11 | 8 | 11 |
| Group 19 | 1 | 12 | 15 | 5 | 4 | 14 | 3 | 16 | 7 | 8 | 6 | 2 | 10 | 11 | 13 |
| Group 20 | 1 | 15 | 4 | 3 | 7 | 6 | 10 | 13 | 12 | 5 | 14 | 16 | 8 | 2 | 11 |
| Group 21 | 1 | 16 | 3 | 12 | 11 | 9 | 13 | 5 | 8 | 2 | 14 | 7 | 4 | 10 | 15 |
| Group 22 | 2 | 2 | 5 | 10 | 16 | 11 | 3 | 10 | 11 | 8 | 5 | 13 | 3 | 13 | 8 |
| Group 23 | 2 | 2 | 12 | 3 | 15 | 5 | 8 | 3 | 5 | 14 | 12 | 9 | 8 | 9 | 14 |
| Group 24 | 2 | 3 | 6 | 16 | 12 | 16 | 3 | 13 | 13 | 6 | 7 | 9 | 2 | 12 | 7 |
| Group 25 | 2 | 3 | 8 | 2 | 9 | 15 | 14 | 3 | 14 | 9 | 5 | 5 | 15 | 8 | 12 |
| Group 26 | 2 | 4 | 7 | 9 | 5 | 4 | 9 | 11 | 2 | 14 | 5 | 14 | 11 | 16 | 16 |
| Group 27 | 2 | 4 | 13 | 12 | 12 | 7 | 15 | 10 | 5 | 2 | 15 | 5 | 13 | 7 | 4 |
| Group 28 | 2 | 5 | 9 | 9 | 3 | 12 | 8 | 14 | 15 | 12 | 14 | 5 | 3 | 2 | 15 |
| Group 29 | 2 | 5 | 11 | 7 | 2 | 11 | 9 | 4 | 16 | 7 | 16 | 9 | 14 | 14 | 4 |
| Group 30 | 2 | 6 | 2 | 13 | 3 | 3 | 12 | 9 | 7 | 16 | 6 | 9 | 16 | 13 | 12 |
| Group 31 | 2 | 6 | 9 | 7 | 7 | 16 | 13 | 3 | 12 | 2 | 13 | 12 | 9 | 16 | 6 |
| Group 32 | 2 | 7 | 12 | 15 | 2 | 12 | 4 | 10 | 13 | 15 | 13 | 4 | 5 | 5 | 10 |
| Group 33 | 2 | 7 | 14 | 16 | 5 | 9 | 2 | 9 | 16 | 11 | 11 | 5 | 7 | 4 | 14 |
| Group 34 | 2 | 8 | 5 | 12 | 5 | 2 | 14 | 14 | 8 | 15 | 3 | 9 | 12 | 15 | 9 |
| Group 35 | 2 | 9 | 13 | 4 | 2 | 13 | 8 | 11 | 6 | 4 | 6 | 8 | 15 | 15 | 11 |
| Group 36 | 2 | 10 | 3 | 2 | 13 | 16 | 8 | 10 | 8 | 13 | 11 | 11 | 16 | 3 | 5 |
| Group 37 | 2 | 11 | 15 | 3 | 11 | 6 | 14 | 10 | 15 | 10 | 6 | 7 | 7 | 14 | 3 |
| Group 38 | 2 | 16 | 4 | 5 | 16 | 14 | 7 | 11 | 4 | 11 | 14 | 9 | 9 | 7 | 5 |
| Group 39 | 3 | 3 | 4 | 6 | 11 | 12 | 13 | 6 | 12 | 14 | 4 | 5 | 13 | 5 | 14 |
| Group 40 | 3 | 3 | 6 | 5 | 16 | 9 | 15 | 5 | 9 | 10 | 6 | 4 | 15 | 4 | 10 |
| Group 41 | 3 | 4 | 5 | 14 | 4 | 6 | 12 | 13 | 5 | 13 | 6 | 11 | 11 | 12 | 14 |
| Group 42 | 3 | 4 | 9 | 16 | 10 | 4 | 16 | 15 | 3 | 5 | 10 | 5 | 15 | 6 | 6 |
| Group 43 | 3 | 4 | 16 | 10 | 5 | 10 | 4 | 9 | 9 | 16 | 15 | 6 | 3 | 5 | 15 |
| Group 44 | 3 | 5 | 12 | 11 | 14 | 5 | 11 | 13 | 3 | 6 | 14 | 6 | 13 | 4 | 4 |
| Group 45 | 3 | 6 | 4 | 10 | 6 | 5 | 9 | 15 | 4 | 15 | 5 | 16 | 16 | 9 | 10 |
| Group 46 | 3 | 7 | 8 | 8 | 16 | 11 | 12 | 4 | 15 | 11 | 4 | 7 | 16 | 3 | 15 |
| Group 47 | 3 | 7 | 16 | 11 | 4 | 15 | 3 | 15 | 11 | 12 | 12 | 4 | 7 | 8 | 16 |
| Group 48 | 3 | 8 | 7 | 15 | 4 | 8 | 15 | 12 | 3 | 16 | 4 | 16 | 12 | 11 | 11 |
| Group 49 | 3 | 8 | 15 | 4 | 16 | 4 | 8 | 7 | 7 | 15 | 12 | 11 | 3 | 16 | 12 |
| Group 50 | 3 | 10 | 10 | 15 | 16 | 5 | 4 | 6 | 16 | 4 | 3 | 15 | 9 | 6 | 9 |
| Group 51 | 3 | 13 | 11 | 5 | 4 | 12 | 4 | 11 | 6 | 6 | 5 | 3 | 14 | 13 | 12 |
| Group 52 | 3 | 14 | 7 | 9 | 14 | 10 | 13 | 8 | 7 | 8 | 10 | 4 | 4 | 13 | 9 |
| Group 53 | 5 | 5 | 8 | 14 | 16 | 13 | 6 | 14 | 13 | 7 | 8 | 15 | 6 | 15 | 7 |
| Group 54 | 5 | 6 | 11 | 7 | 10 | 8 | 5 | 8 | 7 | 12 | 12 | 10 | 6 | 9 | 11 |
| Group 55 | 5 | 6 | 13 | 8 | 13 | 5 | 7 | 7 | 6 | 16 | 14 | 15 | 8 | 16 | 15 |
| Group 56 | 5 | 7 | 9 | 10 | 7 | 11 | 6 | 12 | 9 | 12 | 11 | 8 | 8 | 6 | 10 |
| Group 57 | 5 | 9 | 6 | 8 | 10 | 9 | 8 | 12 | 5 | 11 | 10 | 11 | 12 | 7 | 7 |
| Group 58 | 5 | 10 | 10 | 12 | 8 | 11 | 9 | 7 | 8 | 9 | 5 | 12 | 6 | 7 | 6 |
| Group 59 | 5 | 10 | 12 | 6 | 5 | 12 | 8 | 9 | 7 | 6 | 7 | 8 | 11 | 11 | 9 |
| Group 60 | 5 | 13 | 15 | 15 | 14 | 8 | 6 | 7 | 16 | 8 | 7 | 13 | 14 | 5 | 16 |
| Group 61 | 9 | 10 | 13 | 10 | 11 | 15 | 15 | 9 | 16 | 12 | 14 | 13 | 16 | 14 | 11 |
| Group 62 | 9 | 11 | 12 | 15 | 12 | 9 | 13 | 13 | 11 | 14 | 10 | 16 | 15 | 14 | 16 |
| Group 63 | 9 | 12 | 10 | 15 | 13 | 14 | 9 | 14 | 15 | 11 | 11 | 13 | 12 | 16 | 10 |

Thus, in the prior art, the three step searching is performed as follows. A correlation is performed with the PSC over one or more slot intervals. One or more slot hypotheses are then generated. Once one or more slot hypotheses are determined, step two searching begins. When 15 slots have been determined, the code group may be identified, assuming the slot boundary was valid. Once step two searching is complete, step three searching begins. The typical prior art implementation thus serialized the three steps to determine the scrambling code.

Figure 4:
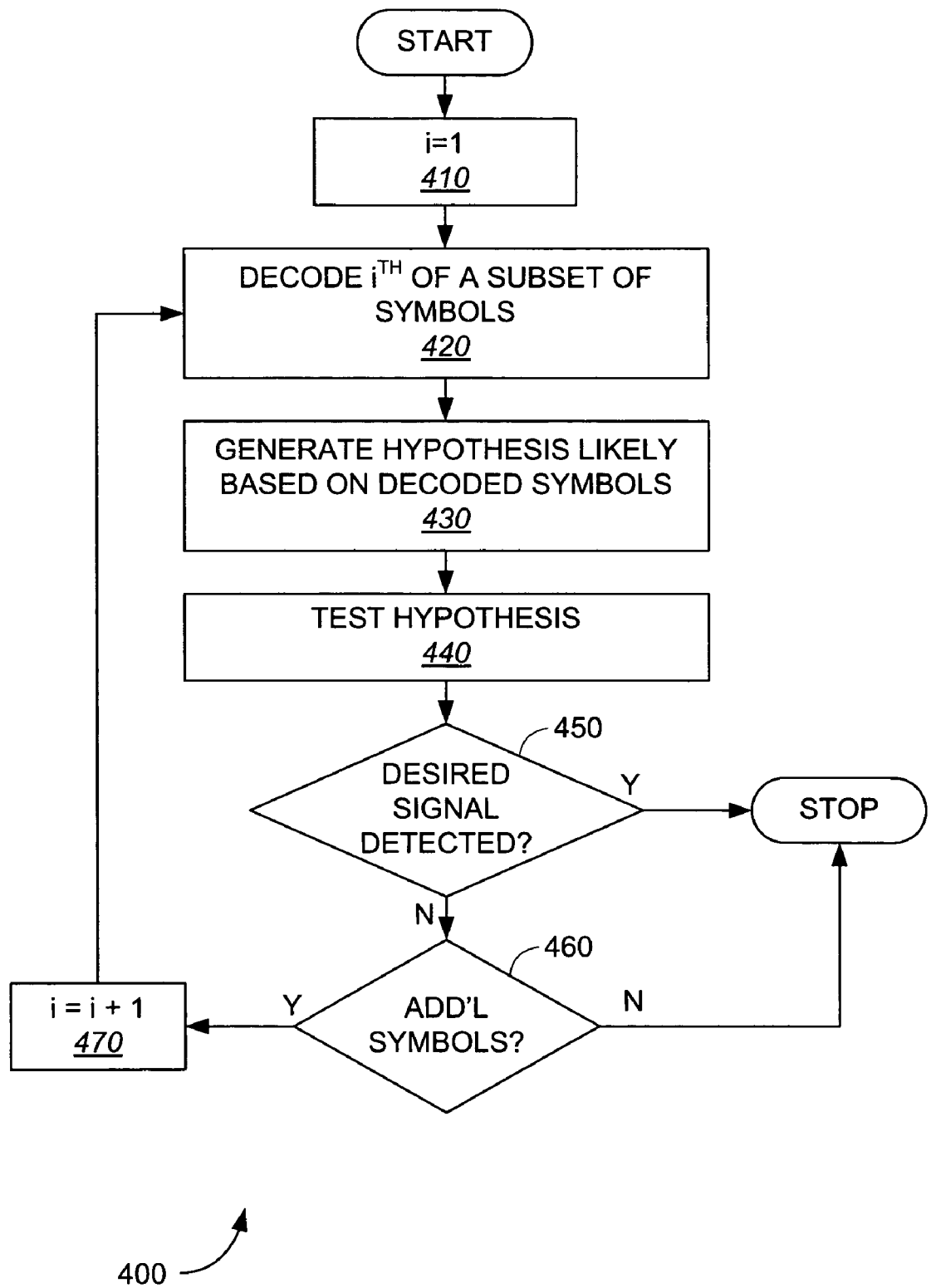
FIG. 4 depicts an example embodiment of a method for scrambling code acquisition.

FIG. 4 depicts an example embodiment of a method 400 for scrambling code acquisition. In this example, in contrast to the serial progression of searching through various phases, as described above, a hypothesis is generated in a first search phase based on a subset of symbols of the respective codes. Once a first hypothesis is generated, next phase searching may begin according to that hypothesis while searching in the first phase continues, to improve the accuracy and/or determine whether the hypothesis was a false alarm. Thus, each phase may be performed in parallel, beginning as early as possible. Subsequent phases may restart when a better hypothesis is determined in an earlier phase. At 410, variable i is used to index within a subset of symbols. At 420 decode the $i^{th}$ symbol making up the desired code. For example, in a step two W-CDMA search, the first symbol of a code group would be the SSC associated with slot #0. At 430, generate a likely hypothesis based on decoded symbols. At 440, test the hypothesis. Testing may include performing additional searching for one or more additional codes (i.e. step 3 searching for a CPICH), or may include other communication functions such as system acquisition, decoding of broadcast channels, and the like, which may indicate whether the hypothesis was associated with a valid base station transmission. At decision block 450, if the desired symbol is detected, the process may stop, as acquisition has been completed. If not, at decision block 460, if there are additional symbols yet to be received in the sequence, proceed to 470. Otherwise the process may stop. Note that the process may be iterated for as long as acquisition is desired. At 470, increment the index i and repeat the process, decoding the next in the subset of symbols.

The general method 400 may be used with any type of symbol. For example, during step one searching, a subset of the PSC may be used. Thus, each chip of the PSC may be correlated and a hypothesis generated to begin step-two slot decoding. Or, as detailed in various embodiments below, the subset of symbols decoded may comprise the SSCs of the secondary SCH. Those of skill in the art will adapt this method for use in any type of code. Note that, while the test is being performed at 440, additional decoding may be performed to improve the hypothesis, as shown.

Figure 5:
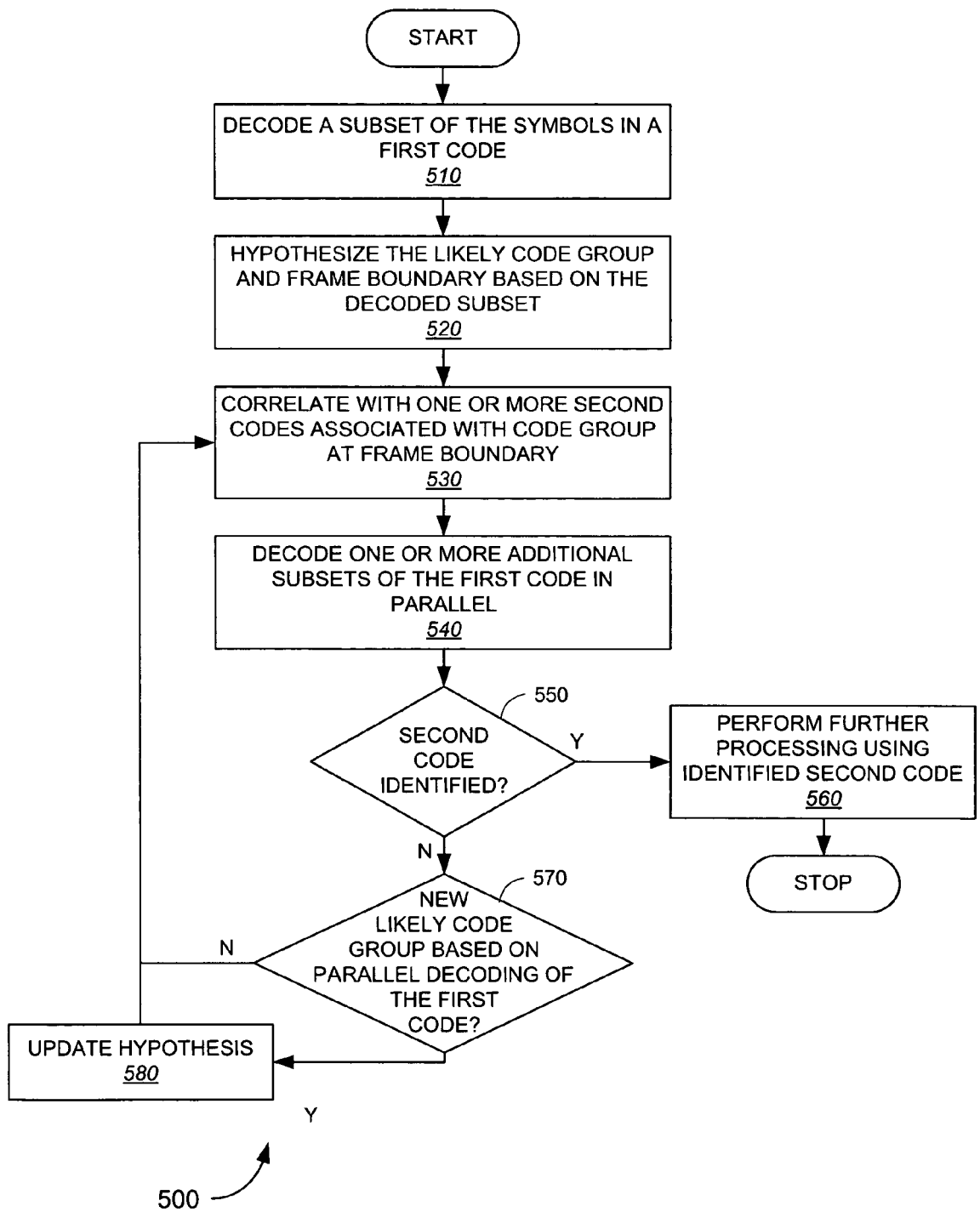
FIG. 5 illustrates an example embodiment of a method for identifying code groups.

FIG. 5 illustrates an example embodiment of a method 500 for identifying code groups, such as the sequences of SSCs defined in the W-CDMA standard. This method is described in accordance with a system in which a code group is identified by a series of symbols and the code group is associated with a second code to be identified. An example system is the W-CDMA system detailed above. At 510, a subset of the symbols of a first code is decoded. Note that the subset may be one or more symbols. In the W-CDMA example, a scrambling code group is completely identified with 15 SSCs. The subset of symbols selected for use at 510 may be increased or decreased for the desired probability of detection. Using too few symbols may result in additional false alarms. Using too many symbols, while improving accuracy, may also result in increased acquisition time. Those of skill in the art will adapt this method for the probabilities desired.

At 520, hypothesize the likely code group and frame boundary based on the decoded subset. In this example, the frame boundary is the frame boundary associated with the second code. Again, if the subset decoded is a single symbol, the number of likely code groups and frame boundaries will be larger than if two or more symbols are used. At 530, correlate with one or more second codes, associated with the code group, at the frame boundary, in accordance with the hypothesis. At 540, in parallel with the second code correlation, decode one or more additional subsets of the first code. Thus, the subset at 510 may include a single symbol to generate one or more hypotheses, which may be refined as additional symbols are decoded.

At 550, if the second code is identified, then proceed to 560 and perform further processing using the identified second code. The examples of processing include performing time tracking or other sequence synchronization improvements, or other communication processes such as demodulation of data with the second code, etc.

At 550, if the second code is not identified, determine if a new likely code group has been identified based on parallel decoding of the first code. In other words, if additional received symbols indicate that the code group used in the attempt to identify the second code group, at 530, was incorrect, the hypothesis may be updated at 580. If additional symbols have not changed the likelihood that the hypothesis is correct, proceed directly to 530. In either case continue correlating with additional second code groups at the hypothesis in order to find the second code.

The methods illustrated in both FIGS. 4 and 5 may be understood further in light of an example. Consider a W-CDMA example. In this example, the first code will comprise an SCH sequence of 15 SSC codes. Thus, the first code is comprised of symbols, each symbol being an SSC code. The second code, in this example, would be a pilot channel, such as the CPICH. In this example, assume that a single symbol is decoded at 510. In this illustration, we will assume that the first SSC identified is SSC #6. By examining Table 1 it can be seen that there are 61 hypotheses that are consistent with receiving SSC #6. Note that the first location of SSC #6 in Table 1 can be found in scrambling code group 2. A corresponding hypothesis could thus be that scrambling code group 2 is being transmitted and the slot number is 8. Thus, at step 520, this code group and frame boundary may be determined as a likely hypothesis. One or more of the scrambling codes associated with group 2 may be correlated at 530 with the assumption that the current slot is slot 8. Depending on the implementation, many searches of hypotheses may be able to be performed before an additional subset of the first code (i.e. an additional SSC) may be decoded. In such a case, multiple hypotheses may be tested at 530. Additional hypotheses consistent with receiving SSC #6 are detailed in Table 2, below.

TABLE 2

Example Hypotheses for SSC # 6

| Hypothesis # | Group # | Slot # |
|---|---|---|
| 1 | 2 | 8 |
| 2 | 3 | 5 |
| 3 | 3 | 12 |
| 4 | 4 | 3 |
| 5 | 4 | 4 |
| 6 | 5 | 9 |
| 7 | 5 | 13 |
| 8 | 7 | 2 |
| 9 | 7 | 3 |
| 10 | 8 | 1 |
| 11 | 8 | 11 |
| 12 | 9 | 1 |
| 13 | 9 | 6 |
| 14 | 10 | 11 |
| 15 | 10 | 12 |
| 16 | 15 | 3 |
| 17 | 16 | 6 |
| 18 | 17 | 14 |
| 19 | 19 | 10 |
| 20 | 20 | 5 |
| 21 | 24 | 6 |
| 22 | 24 | 9 |
| 23 | 30 | 1 |
| 24 | 30 | 10 |
| 25 | 31 | 1 |
| 26 | 31 | 14 |
| 27 | 35 | 8 |
| 28 | 35 | 10 |
| 29 | 37 | 5 |
| 30 | 37 | 10 |
| 31 | 39 | 3 |
| 32 | 39 | 7 |
| 33 | 40 | 2 |
| 34 | 40 | 10 |
| 35 | 41 | 5 |
| 36 | 41 | 10 |
| 37 | 42 | 13 |
| 38 | 42 | 14 |
| 39 | 43 | 11 |
| 40 | 44 | 9 |
| 41 | 44 | 11 |
| 42 | 45 | 1 |
| 43 | 45 | 4 |
| 44 | 50 | 7 |
| 45 | 50 | 13 |
| 46 | 51 | 8 |
| 47 | 51 | 9 |
| 48 | 53 | 6 |
| 49 | 53 | 12 |
| 50 | 54 | 1 |
| 51 | 54 | 12 |
| 52 | 55 | 1 |
| 53 | 55 | 8 |
| 54 | 56 | 6 |
| 55 | 56 | 13 |
| 56 | 57 | 2 |
| 57 | 58 | 12 |

TABLE 2-continued

Example Hypotheses for SSC # 6

| Hypothesis # | Group # | Slot # |
|---|---|---|
| 58 | 58 | 14 |
| 59 | 59 | 6 |
| 60 | 59 | 9 |
| 61 | 60 | 6 |

Continuing with this example, while testing one or more of the hypotheses illustrated in Table 2, as described above, a second SSC is received (i.e. an additional subset of the first code is decoded in parallel at 540). In this case, assume that SSC #5 is received. In contrast with the 61 hypotheses possible with the single symbol subset, this subset of two symbols yields only 7 hypotheses. Again, as shown in Table 1, it can be seen that the first occurrence of SSC #6 followed by SSC #5 is group 3 at slot 5. A second is group 9 at slot 6. The hypotheses for the subset of two symbols comprising SSC #6 followed by SSC #5 is shown in Table 3.

TABLE 3

Hypotheses for receiving SSC 6 followed by SSC 5

| Hypothesis # | Group # | Slot # | Next SSC |
|---|---|---|---|
| 1 | 3 | 5 | (2) |
| 2 | 9 | 6 | (5) |
| 3 | 40 | 2 | (16) |
| 4 | 45 | 4 | (9) |
| 5 | 51 | 9 | (3) |
| 6 | 58 | 14 | (10) |
| 7 | 59 | 3 | (12) |

Shown in parentheses next to each hypothesis in Table 3 is the expected next SSC. With two symbols, number of code group hypotheses is dramatically reduced. Correlation with associated pilot scrambling codes may be performed in parallel with additional decoding of the first code, as shown in FIG. 5. A third symbol may be decoded to form a subset of three. Note that, as shown in Table 3, once three SSC symbols are received, in this illustration, the code group has been identified. Tables 2 and 3, as shown, for receiving SSC#6 followed by SSC #5, serve to illustrate the general techniques of methods 400 or 500.

As described above, it may be that performing additional searching on hypotheses can be performed at a high rate. For example, correlators and searchers are known for testing multiple hypotheses simultaneously. Thus, the 61 hypotheses identified above may be reduced if the hypotheses are based on simply the slot number. In other words, if searching multiple code groups for each slot hypotheses may be performed efficiently, then identifying a single SSC results in fewer than 61 hypotheses. For example, when SSC #6 is received, as shown in Table 1, it can be seen that there are no code groups for which SSC 6 would indicate slot #0. A 6 in slot #1 yields seven possible code groups (8, 9, 30, 31, 45, 54, and 55). The number of code groups identified for each possible slot number hypothesis upon receiving SSC #6, are identified in Table 4.

TABLE 4

Example Slot Hypotheses

| Slot # | Groups | Total |
|---|---|---|
| 0 | 0 | 0 |
| 1 | 8, 9, 30, 31, 45 54, 55 | 7 |
| 2 | 7, 40, 57 | 3 |
| 3 | 4, 7, 15, 39 | 4 |
| 4 | 4, 45 | 2 |
| 5 | 3, 20, 37, 41 | 4 |
| 6 | 9, 16, 24, 53, 56, 59, 60 | 7 |
| 7 | 39, 50 | 2 |
| 8 | 2, 35, 51, 55 | 4 |
| 9 | 5, 24, 44, 51, 59 | 5 |
| 10 | 19, 30, 35, 37, 40, 41 | 6 |
| 11 | 8, 10, 43, 44 | 4 |
| 12 | 3, 10, 53, 54, 58 | 5 |
| 13 | 5, 42, 50, 56 | 4 |
| 14 | 17, 31, 42, 58 | 4 |

Thus, as can be seen in Table 4, if, given a slot hypothesis, a searcher can perform seven code group correlations, then only 14 hypotheses need to be generated. If a searcher can perform six code group correlations for a slot hypothesis, there are 16 hypotheses. If a searcher can perform five code group correlations for a slot hypothesis, there are 17 hypotheses. If a searcher can perform four code group correlations for a slot hypothesis, there are 19 hypotheses. If a searcher can perform three code group correlations for a slot hypothesis, there are 27 hypotheses. If a searcher can perform two code group correlations for a slight hypothesis, there are 33 hypotheses. If only a single code group can be correlated with a slot hypothesis, then there are 61 hypotheses, as detailed above.

Figure 6:
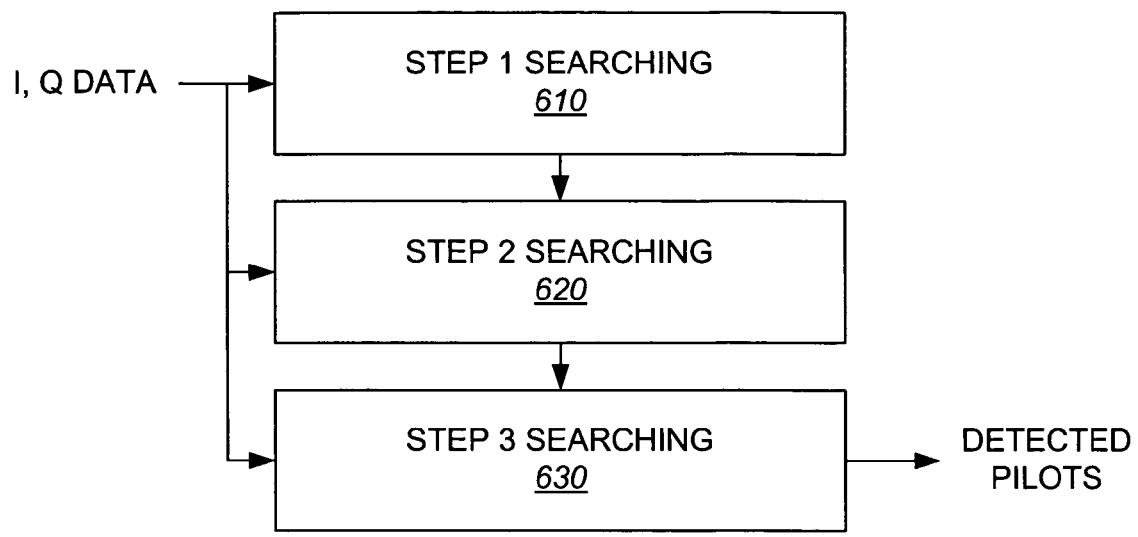
FIG. 6 depicts an example embodiment of a user terminal employing three-step searching.

FIG. 6 depicts an example embodiment of a user terminal 106. A subset of blocks is shown. The blocks shown may be contained in a searcher, such as searcher 240, a processor such as processor 250, or a combination of both. In this example, I and Q data are delivered simultaneously to step one searching block 610, step two searching block 620, and step searching block 630. Note that results from step one searching block 610 are delivered to step two searching 620, and results from step two searching block 620 are delivered to step three searching block 630. Detected pilots are generated from step three searching block 630. This embodiment is suitable for deployment for detecting W-CDMA signals, as detailed above. Example embodiments of methods for performing step one, step two, and step three searching, as shown, are illustrated below with respect to FIGS. 7-9, respectively. Each of these example embodiments are examples of processes adapted from those illustrated in FIGS. 4 and 5.

Figure 7:
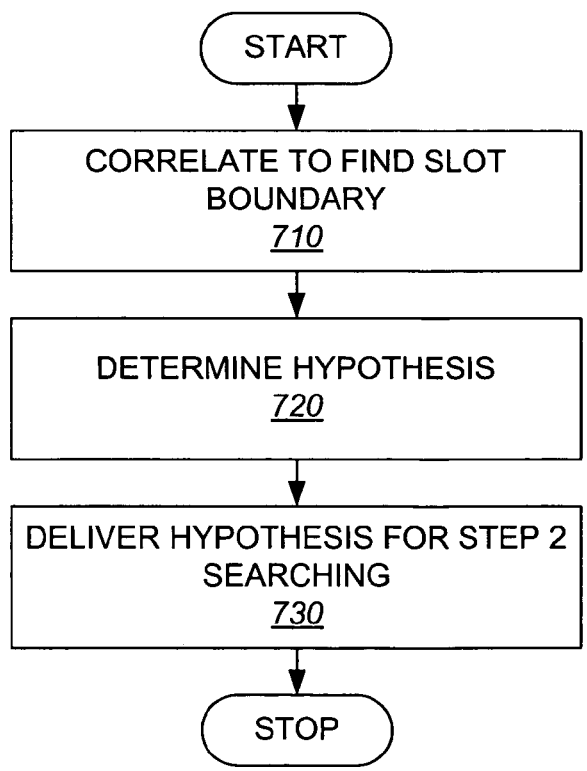
FIG. 7 depicts an example embodiment of a method for performing step one searching.

FIG. 7 depicts an example embodiment of a method 700 for performing step one searching. At 710, correlate to find a slot boundary. In one embodiment, slot boundary searching may be performed using traditional prior art methods. In an alternate embodiment, a subset of the PSC may be used to generate multiple hypotheses, as shown in FIGS. 4 and 5. At 720, determine a hypothesis. At 730, deliver the hypothesis for step two searching.

Figure 8:
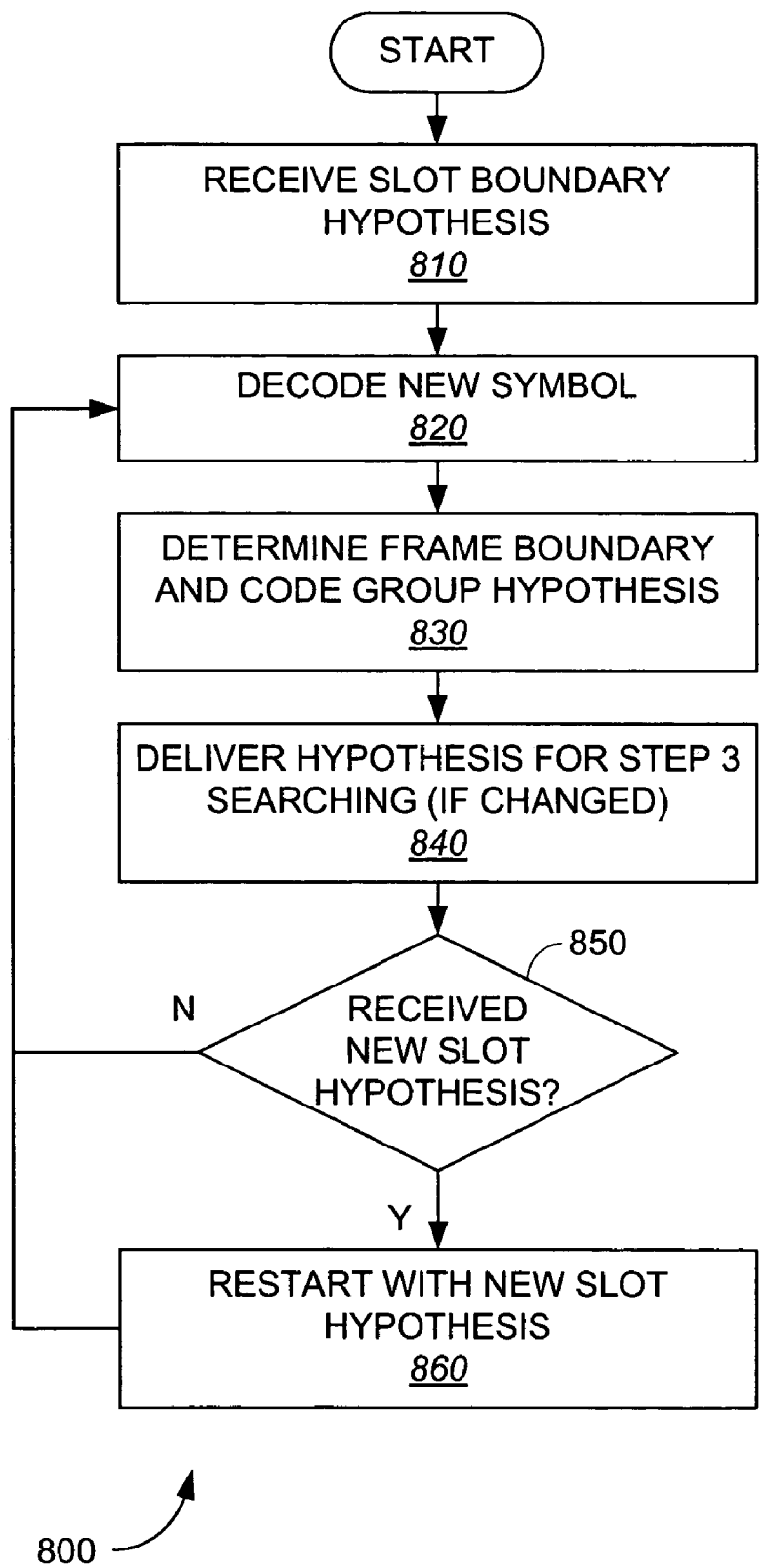
FIG. 8 depicts an example embodiment of a method for performing step two searching.

FIG. 8 depicts an example embodiment of a method 800 for performing step two searching. At 810, receive a slot boundary hypothesis such as that determined above with respect to block 730. At 820, decode a new symbol. In the example embodiment, the symbol is an SSC code. At 830, determine the frame boundary and code group hypothesis in accordance with the symbol decoded at 820. At 840, deliver the hypothesis for step three searching if it has changed from a previous hypothesis delivered. At 850, if a new slot hypothesis is received from step one searching, proceed to 860 to restart with a new hypothesis. Then proceed to decode a new symbol at 820, as described above. If no new hypothesis is received, proceed to decode the next symbol at 820.

Figure 9:
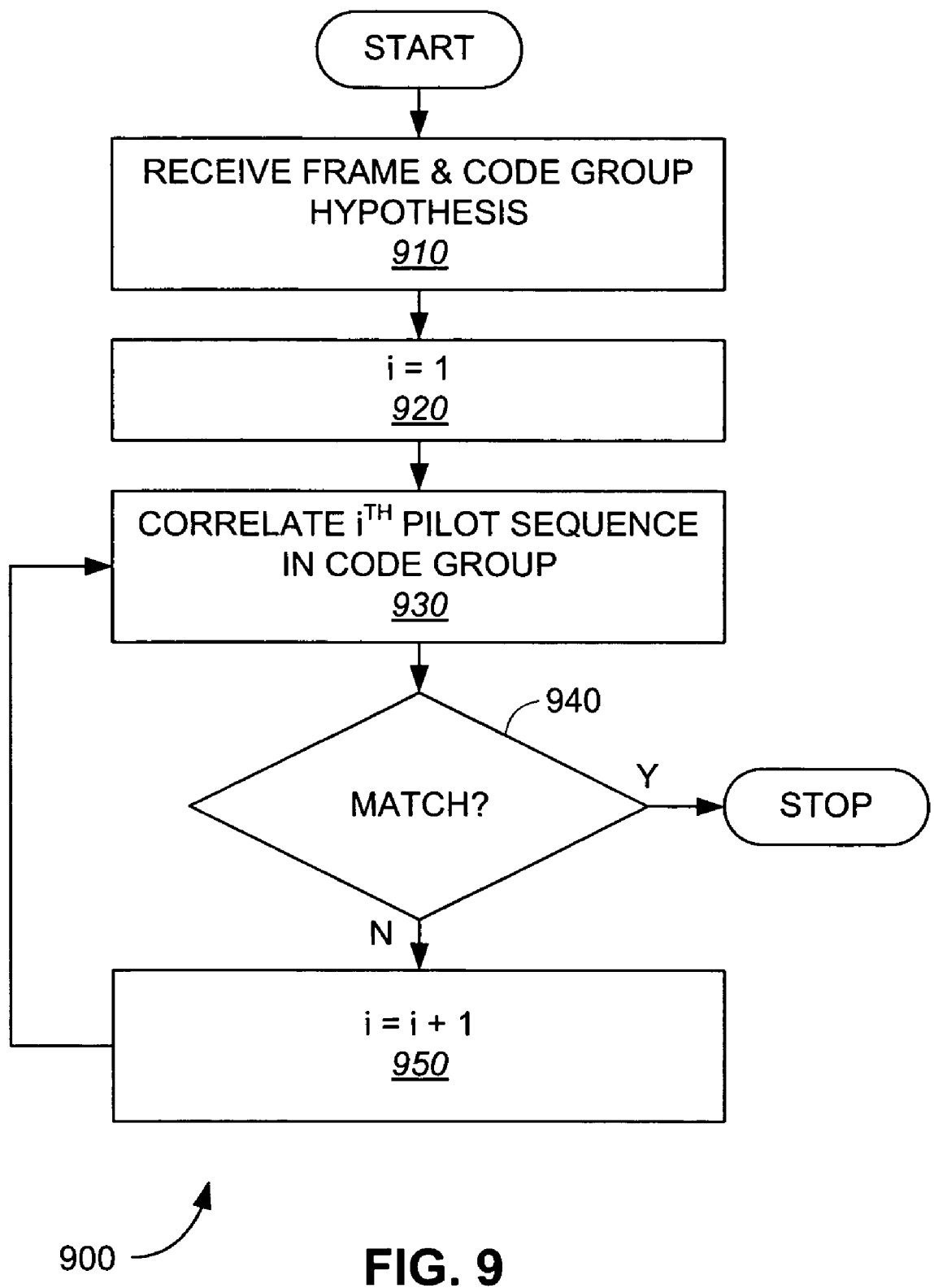
FIG. 9 depicts an example embodiment of a method for performing step three searching.

FIG. 9 depicts an example embodiment of a method 900 for performing step three searching. At 910, receive a frame and code group hypothesis, such as from step two searching block 620. At 920, index i is used to identify the pilot sequence being tested in a code group. At 930 correlate the i$^{th}$ pilot sequence in the code group identified in the hypothesis according to the frame boundary identified in the hypothesis. At decision block 940, if there is a match, the code has been identified and the process may stop. If not, proceed to 950, increment the index i, and attempt to correlate with the next pilot sequence in the code group.

In example embodiments described herein, various search stages, i.e. 610, 620, or 630, have been described as delivering hypotheses for searching to the respective next stage. Delivering a hypothesis may comprise sending any indication identifying one or more offsets to test and one or more sequences for correlation. The hypotheses may identify offsets and/or sequences with index values, or other means for identifying the offset or sequence. In one embodiment, a set of hypotheses may be delivered to the next stage searching which may begin immediately. When subsequent symbols are found in an earlier stage, a message or signal may be delivered to the next stage to remove previous hypotheses when certain of those hypotheses have been eliminated. For example, in the illustrative example above, 61 hypotheses were in effect after the first SSC symbol was received. The number of valid hypotheses was reduced to 7 once the second symbol was received. After the third symbol was received, the valid hypothesis set is reduced to a single hypothesis. In each case, the next hypothesis set is indicated, in whatever fashion is desired, to indicate to the next stage that searching on those hypotheses is no longer required.

Figure 10:
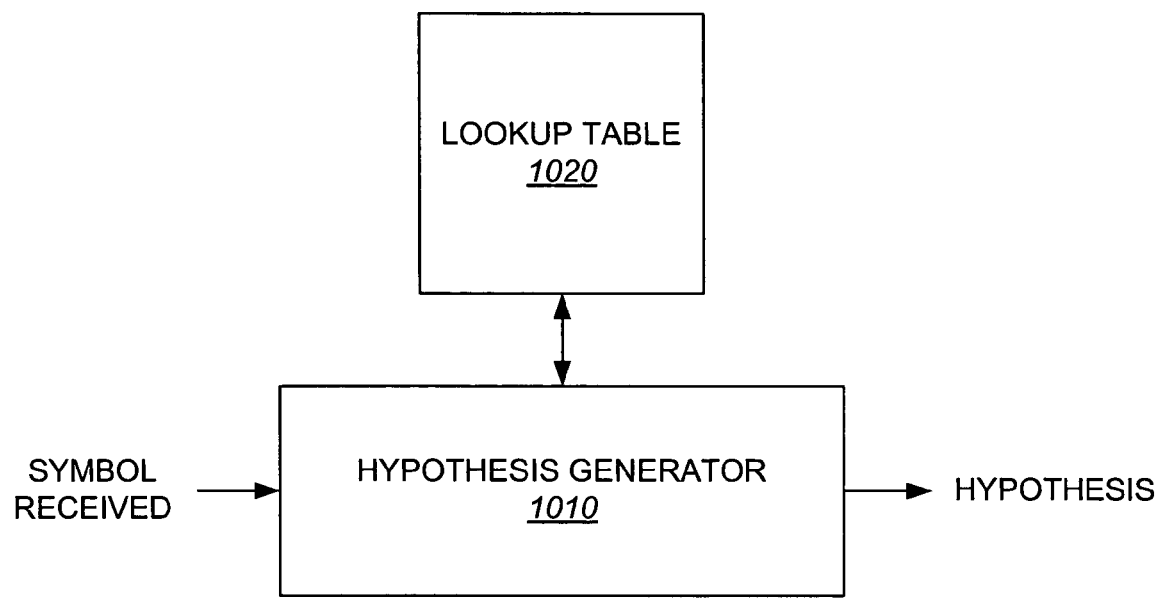
FIG. 10 illustrates an example embodiment of a hypothesis generator suitable for deployment as a portion of a user terminal.

FIG. 10 illustrates an example embodiment of a hypothesis generator 1010, suitable for deployment as a portion of a user terminal 106. One or more symbols are received at hypothesis generator 1010 and a hypothesis is produced. A hypothesis generator may be a function or procedure based in software, such as in a processor 250, or may be deployed in hardware, or a combination of both. In this example, a lookup table 1020 is used in conjunction with the hypothesis generator to produce the hypothesis. While a lookup table is convenient, it is not required. Hypothesis generator 1010 may determine the likely hypotheses based on received symbols, as described above in the illustrative example. A lookup table 1020 may be stored in memory, such as memory 255, detailed above.

Figure 11:
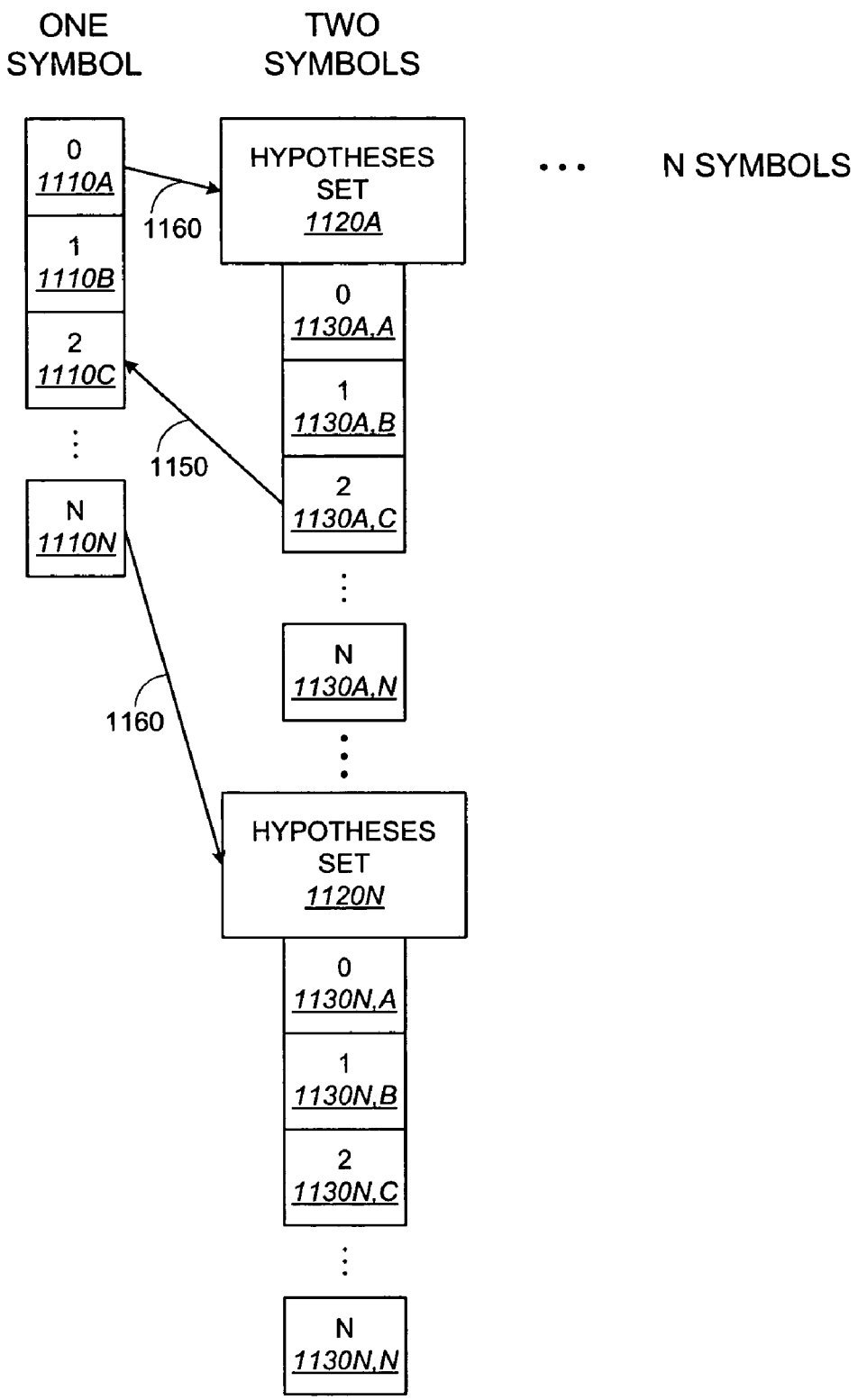
FIG. 11 depicts an example embodiment of a lookup table for use in generating hypotheses.

FIG. 11 depicts an example embodiment of a lookup table 1020 for use in generating hypotheses. In this example, the lookup table is illustrated using N columns to represent up to N symbols received, where N or fewer symbols form the subset of symbols received for which a hypothesis is generated. In this example, an entry in the first column corresponding to one of N possible symbols, 1110A-N contain values indicating the hypothesis for receiving that corresponding symbol 0-N. Various types of lookup tables are well known in the art. In this example, pointer 1160 may be used to point to a hypothesis set 1120 associated with the received subset. In this example, the second column also includes lookup table locations for the second symbol received 1130. In this example, a set of N values corresponding to the first symbol valued 0, 1130A, A-1130A, N are associated with receiving a first symbol 0 and any of N second symbols. There are N such sets. Those of skill in the art will recognize that any size lookup table may be deployed. In one example, the table is fully populated with pointers from one column to the next, identifying the entire possible set of received symbols. Alternatively, a subset thereof may be deployed. In the example embodiment, there are up to 15 symbols. However, as shown above, likely hypotheses may be generated using far fewer than 15 symbols.

In some cases, the various symbol sets need not be fully populated. In some circumstances, a symbol following another received symbol is not valid. For example, if an SSC #6 is received, followed by an SSC #5, there are only seven valid third received symbols, as described above. In an alternate embodiment, these invalid positions may be populated nonetheless to indicate this invalid sequence. Various techniques may be deployed in this circumstance. In one example, the position associated with an invalid received symbol comprises a pointer value 1150 back to a previous column. In one example, it will be presumed that the first symbol received is invalid. Thus, the pointer returns to a previous column associated with a smaller subset of symbols, the location in that column associated with the received sequence, not including the first symbol in the sequence which has been removed. As new symbols are added, the lookup table may be traversed forwards and backwards through valid and invalid pointers until a reliable sequence is determined and the associated scrambling code is identified. In an alternate embodiment, it can be presumed that the last received symbol is invalid and returned to the previous or alternate valid code. Thus, pointer 1150 may point to an alternate location within the same column. This pointer may be selected to an alternate location based on code distance or other likely alternative. Various other techniques well known in the art may be deployed. Soft decision techniques, trellis coding, and other such techniques may also be incorporated, as will be apparent to one of ordinary skill in the art.

In another alternate embodiment, a hypothesis generator 1010 may simply be connected to a lookup table similar to Table 1. Each time a series of symbols or subset of symbols is received, the table can be searched for matches. A combination of these techniques may also be deployed.

Figure 12:
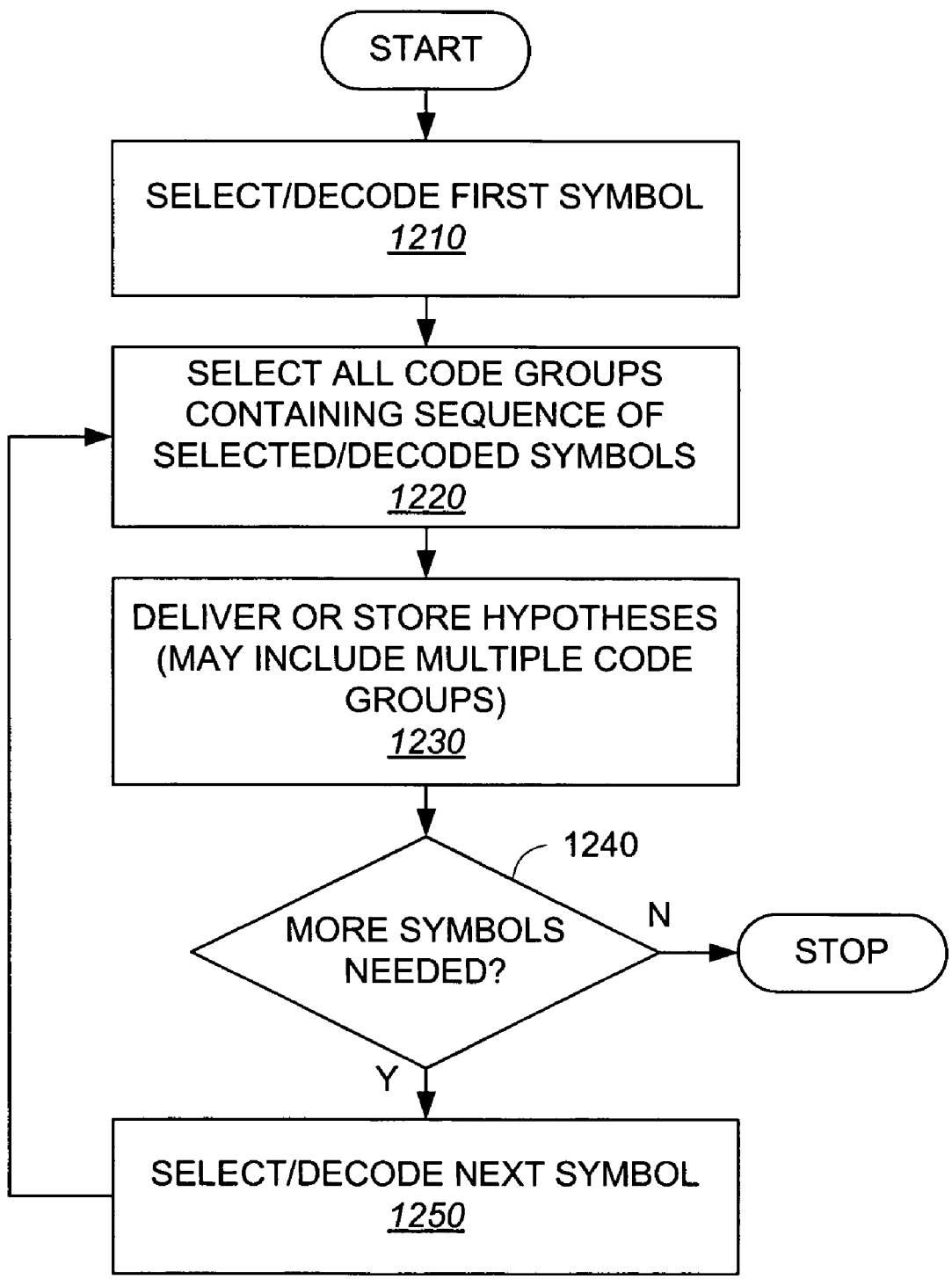
FIG. 12 illustrates an example embodiment of a method for hypothesis generation or lookup table generation.

FIG. 12 illustrates an example embodiment of a method 1200 for hypothesis generation or lookup table generation. In one embodiment, method 1200 may be used in symbols as they are received and decoded, to produce hypotheses (i.e. for use in a hypothesis generator 1010). In an alternate embodiment lookup table such as lookup table 1020 in FIG. 11 may be produced using such a method by selecting various possible receive sequences and forming the resultant lookup table. At 1210, select a first received symbol, or in the alternative embodiment, decode the first received symbol. At 1220, select all code groups containing the current sequence of selected or decoded symbols. At 1230, deliver hypotheses to a subsequent search process (i.e. step two or step three searching, as described above) or store in a lookup table. These hypotheses may include multiple code groups, as described above in the illustrative example. The hypotheses may be selected by searching through a table such as Table 1 or any other table similar associated with the communication format and/or standard being deployed. At 1240, if more symbols are needed to determine the likely hypothesis (i.e. reduce the number of hypotheses), proceed to 1250 to select or decode the next symbol. Then return to 1220 to select the code groups containing all the selected or decoded symbols.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
a receiver that receives one or more signals from one or more remote stations, each signal comprising one of a plurality of scrambling codes, each scrambling code associated with one of a plurality of code groups, each code group comprising a subset of the plurality of scrambling codes, and each code group identified by a unique series of a predetermined number of first synchronization codes selected from a plurality of first synchronization codes;
a first searcher that identifies a subset of first synchronization codes, the subset of first synchronization codes comprising fewer than the predetermined number; and
a processor that determines at least one hypothesis based on the subset of first synchronization codes, each hypothesis representing a likely code group including the subset of first synchronization codes;
wherein the processor is configured to test at least one hypothesis to determine whether at least one hypothesis is associated with a valid transmission while simultaneously determining a reduced hypothesis set derived from the at least one hypothesis by evaluating at least one additional subset of first synchronization codes.

2. The apparatus of claim 1, further comprising a lookup table, wherein the processor selects one or more hypotheses from the lookup table based on the subset of first synchronization codes.

3. The apparatus of claim 1, further comprising a second searcher that receives the one or more hypotheses for searching for one or more scrambling codes in accordance with the one or more hypotheses.

4. The apparatus of claim 3, wherein the second searcher searches one or more scrambling codes in accordance with the one or more hypotheses while the first searcher receives one or more additional first synchronization codes.

5. The apparatus of claim 4, wherein the processor determines one or more hypotheses in response to the subset of first synchronization codes and additional first synchronization codes, and delivers the one or more hypotheses to the second searcher when the one or more hypotheses are different than the one or more hypotheses previously delivered to the second searcher.

6. The apparatus of claim 3, further comprising a demodulator that demodulates a received signal from the receiver with a scrambling code from the second searcher.

7. The apparatus of claim 1, wherein the signal further comprises a series of second synchronization codes, each second synchronization code time aligned with a first synchronization code, the apparatus further comprising a third searcher that searches a second synchronization code, to determine a time alignment from the second synchronization code, and delivers the time alignment to the first searcher.

8. The apparatus of claim 7, wherein the first searcher receives a time alignment from the third searcher and determines a first synchronization code in response.

9. The apparatus of claim 7, wherein the third searcher determines the time alignment after searching a fraction of a second synchronization code.

10. The apparatus of claim 1, wherein a hypothesis comprises a code group identifier.

11. The apparatus of claim 1, wherein a hypothesis comprises a frame boundary.

12. The apparatus of claim 1, wherein a hypothesis comprises a frame boundary and a code group identifier.

13. The apparatus of claim 1, wherein the processor selects one or more hypotheses by comparing scrambling code identifiers associated with the first scrambling codes with a list comprising code groups and sequences of synchronization code identifiers associated therewith, and selecting a code group whose sequence of synchronization code identifiers contains a subsequence of identifiers matching the identifiers associated with the subset of first synchronization codes.

14. The apparatus of claim 13, wherein the processor is further configured to select the one or more hypotheses by accessing a lookup table comprising the list to determine one or more hypotheses.

15. A method comprising:
receiving one or more signals, each signal comprising one of a plurality of scrambling codes, each scrambling code associated with one of a plurality of code groups, each code group comprising a subset of the plurality of scrambling codes, and each code group identified by a unique series of a predetermined number of first synchronization codes selected from a plurality of first synchronization codes;
identifying a subset of first synchronization codes, the subset comprising fewer than the predetermined number;
determining at least one hypothesis based on the subset of first synchronization codes, each hypothesis representing a likely code group including the subset of first synchronization codes; and
testing at least one hypothesis to determine whether at least one hypothesis is associated with a valid transmission while simultaneously determining a reduced hypothesis set derived from the at least one hypothesis by evaluating at least one additional subset of first synchronization codes.

16. The method of claim 15, further comprising searching one or more scrambling codes in accordance with the one or more determined hypotheses.

17. The method of claim 16, further comprising receiving an additional first synchronization code simultaneously with the scrambling code searching.

18. The method of claim 16, wherein the signal further comprises a series of second synchronization codes, each second synchronization code time aligned with a first synchronization code, the method further comprising searching a second synchronization code, determining a time alignment from the second synchronization code, the time alignment for use in identifying a first synchronization code.

19. The method of claim 15, wherein a hypothesis comprises a code group identifier.

20. The method of claim 15, wherein a hypothesis comprises a frame boundary.

21. The method of claim 15, wherein a hypothesis comprises a frame boundary and a code group identifier.

22. The method of claim 15, wherein the determining the one or more hypotheses comprises:
comparing scrambling code identifiers associated with the first scrambling codes with a list comprising code groups and sequences of synchronization code identifiers associated therewith; and
selecting a code group whose sequence of synchronization code identifiers contains a subsequence of identifiers matching the identifiers associated with the subset of first synchronization codes.

23. The method of claim 22, wherein the determining the one or more hypotheses further comprises:
accessing a lookup table comprising the list to determine one or more hypotheses.

24. An apparatus comprising:
means for receiving one or more signals, each signal comprising one of a plurality of scrambling codes, each scrambling code associated with one of a plurality of code groups, each code group comprising a subset of the plurality of scrambling codes, each code group identified by a unique series of a predetermined number of first synchronization codes selected from a plurality of first synchronization codes;
means for identifying a subset of first synchronization codes, the subset comprising fewer than the predetermined number;
means for determining one or more hypotheses in response to the received subset; and
means for testing at least one hypothesis to determine whether at least one hypothesis is associated with a valid transmission while simultaneously determining a reduced hypothesis set derived from the at least one hypothesis by evaluating at least one additional subset of first synchronization codes.

25. A computer readable non-transitory medium encoded with instructions, the instructions comprising code for:
receiving one or more signals, each signal comprising one of a plurality of scrambling codes, each scrambling code associated with one of a plurality of code groups, each code group comprising a subset of the plurality of scrambling codes, and each code group identified by a unique series of a predetermined number of first synchronization codes selected from a plurality of first synchronization codes;
identifying a subset of first synchronization codes, the subset comprising fewer than the predetermined number;
determining at least one hypothesis based on the subset of first synchronization codes, each hypothesis representing a likely code group including the subset of first synchronization codes; and
testing at least one hypothesis to determine whether at least one hypothesis is associated with a valid transmission while simultaneously determining a reduced hypothesis set derived from the at least one hypothesis by evaluating at least one additional subset of first synchronization codes.

26. A wireless communication system comprising:
a first station that transmits a signal comprising one of a plurality of scrambling codes, each scrambling code associated with one of a plurality of code groups, each code group comprising a subset of the plurality of scrambling codes, and each code group identified by a unique series of a predetermined number of first synchronization codes selected from a plurality of first synchronization codes; and
a second station that receives the signal, and identifies a subset of first synchronization codes, the subset comprising fewer than the predetermined number, and determines at least one hypothesis based on the subset of first synchronization codes, each hypothesis representing a likely code group including the subset of first synchronization codes;
wherein the second station is configured to test at least one hypothesis to determine whether at least one hypothesis is associated with a valid transmission while simultaneously determining a reduced hypothesis set derived from the at least one hypothesis by evaluating at least one additional subset of first synchronization codes.

27. The wireless communication system of claim 26, wherein the first station comprises a base station.

28. The wireless communication system of claim 26, wherein the second station comprises computer equipment.

29. A user equipment apparatus, comprising:
a receiver that receives one or more signals from one or more base stations, each signal comprising one of a plurality of scrambling codes, each scrambling code associated with one of a plurality of code groups, each code group comprising a subset of the plurality of scrambling codes, and each code group identified by a unique series of a predetermined number of synchronization codes selected from a plurality of synchronization codes;

a searcher that identifies synchronization codes within the one or more signals; and a processor that identifies at least one hypothesis based on a subset of identified synchronization codes, wherein the subset of identified synchronization codes comprises fewer than the predetermined number of synchronization codes identifying one code group, each hypothesis representing a likely code group including the subset of identified synchronization codes;

wherein the processor is configured to test at least one hypothesis to determine whether at least one hypothesis is associated with a valid transmission while simultaneously determining a reduced hypothesis set derived from the at least one hypothesis by evaluating at least one additional subset of first synchronization codes.

30. A method comprising:

receiving one or more signals from one or more base stations, each signal comprising one of a plurality of scrambling codes, each scrambling code associated with one of a plurality of code groups, each code group comprising a subset of the plurality of scrambling codes, and each code group identified by a unique series of a predetermined number of synchronization codes selected from a plurality of synchronization codes;

identifying synchronization codes within the one or more signals;

identifying at least one hypothesis based on a subset of identified synchronization codes, wherein the subset of identified synchronization codes comprises fewer than the predetermined number of synchronization codes identifying one code group, each hypothesis representing a likely code group including the subset of identified synchronization codes; and testing at least one hypothesis to determine whether at least one hypothesis is associated with a valid transmission while simultaneously determining a reduced hypothesis set derived from the at least one hypothesis by evaluating at least one additional subset of first synchronization codes.

31. An apparatus comprising:

means for receiving one or more signals from one or more base stations, each signal comprising one of a plurality of scrambling codes, each scrambling code associated with one of a plurality of code groups, each code group comprising a subset of the plurality of scrambling codes, and each code group identified by a unique series of a predetermined number of synchronization codes selected from a plurality of synchronization codes;

means for identifying synchronization codes within the one or more signals;

means for identifying at least one hypothesis based on a subset of identified synchronization codes, wherein the subset of identified synchronization codes comprises fewer than the predetermined number of synchronization codes identifying one code group, each hypothesis representing a likely code group including the subset of identified synchronization codes; and means for testing at least one hypothesis to determine whether at least one hypothesis is associated with a valid transmission while simultaneously determining a reduced hypothesis set derived from the at least one hypothesis by evaluating at least one additional subset of first synchronization codes.

32. A computer readable non-transitory medium encoded with instructions, the instructions comprising code for:

receiving one or more signals from one or more base stations, each signal comprising one of a plurality of scrambling codes, each scrambling code associated with one of a plurality of code groups, each code group comprising a subset of the plurality of scrambling codes, and each code group identified by a unique series of a predetermined number of synchronization codes selected from a plurality of synchronization codes;

identifying synchronization codes within the one or more signals;

identifying at least one hypothesis based on a subset of identified synchronization codes, wherein the subset of identified synchronization codes comprises fewer than the predetermined number of synchronization codes identifying one code group, each hypothesis representing a likely code group including the subset of identified synchronization codes; and testing at least one hypothesis to determine whether at least one hypothesis is associated with a valid transmission while simultaneously determining a reduced hypothesis set derived from the at least one hypothesis by evaluating at least one additional subset of first synchronization codes.

\* \* \* \* \*